United States Patent
Ullrich et al.

[15] 3,668,069
[45] June 6, 1972

[54] PRESSURE SUPPRESSION CONTAINMENT FOR A LIQUID-COOLED NUCLEAR REACTOR

[72] Inventors: Walter Ullrich, Neu-Isenburg; Karl-Heinz Lohse, Frankfurt am Main; Jochen Leuteritz, Bruchkobel; Gunter Zeitzschel, Frankfurt am Main; Robert Fassl, Munich, all of Germany

[73] Assignee: Licentia Patent-Verwaltungs-G.m.b.H., Frankfurt am Main, Germany

[22] Filed: Oct. 9, 1968

[21] Appl. No.: 766,049

[52] U.S. Cl..................................176/38, 176/54
[51] Int. Cl.............................................G21c 9/00
[58] Field of Search..........................176/38, 53, 54

[56] References Cited

UNITED STATES PATENTS

| | | | |
|---|---|---|---|
| 3,022,238 | 2/1962 | Kolflat | 176/38 X |
| 3,115,450 | 12/1963 | Schanz | 176/38 X |
| 3,253,996 | 5/1966 | Bond, Jr. et al | 176/38 X |
| 3,287,226 | 11/1966 | Webb | 176/38 X |

FOREIGN PATENTS OR APPLICATIONS

| | | | |
|---|---|---|---|
| 1,303,680 | 8/1961 | France | 176/38 |

Primary Examiner—Leland A. Sebastian
Assistant Examiner—S. R. Hellman
Attorney—Spencer & Kaye

[57] ABSTRACT

Containment apparatus and a pressure suppression system for a liquid-cooled nuclear reactor. The apparatus includes a safety container formed by a spherical pressure shell and a condensation chamber filled with water arranged within the safety container. The condensation chamber, which is annular in shape, is bounded on the outside by the safety container, on the inside by a cylindrical wall within the container, and at the top and bottom by annular ends respectively connecting the top and the bottom of the cylinder with the safety container. A plurality of condensation tubes are provided to pass through the upper end and extend into the water in the condensation chamber. The reactor pressure vessel of the nuclear reactor is located within the cylindrical wall and surrounded by a cylindrical biological shield. The diameter of the shield is less than the diameter of the cylindrical wall so as to form an annular passageway between the shield and the cylindrical wall from the calotte-shaped region of the safety container above, to the calotte-shaped region of the safety container below, the condensation chamber.

16 Claims, 5 Drawing Figures

INVENTORS
WALTER ULLRICH,
KARL-HEINZ LOHSE,
JOCHEN LEUTERITZ,
GÜNTER ZEITZSCHEL,
ROBERT FASSL

BY *Spencer E Hoge*
ATTORNEYS

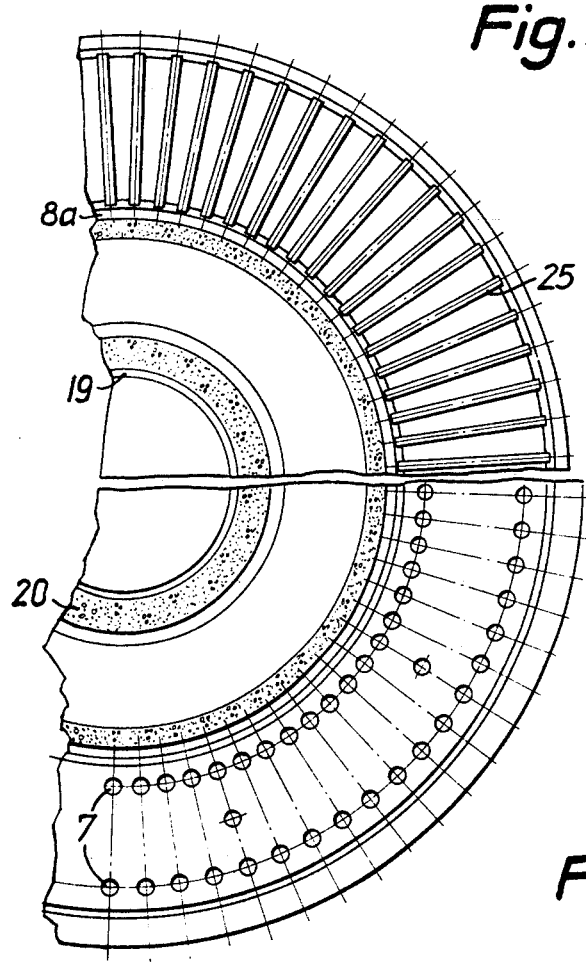
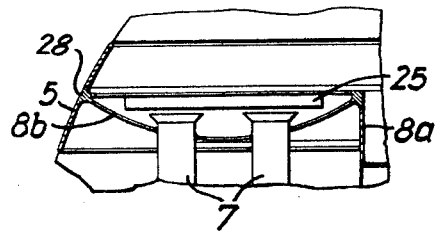

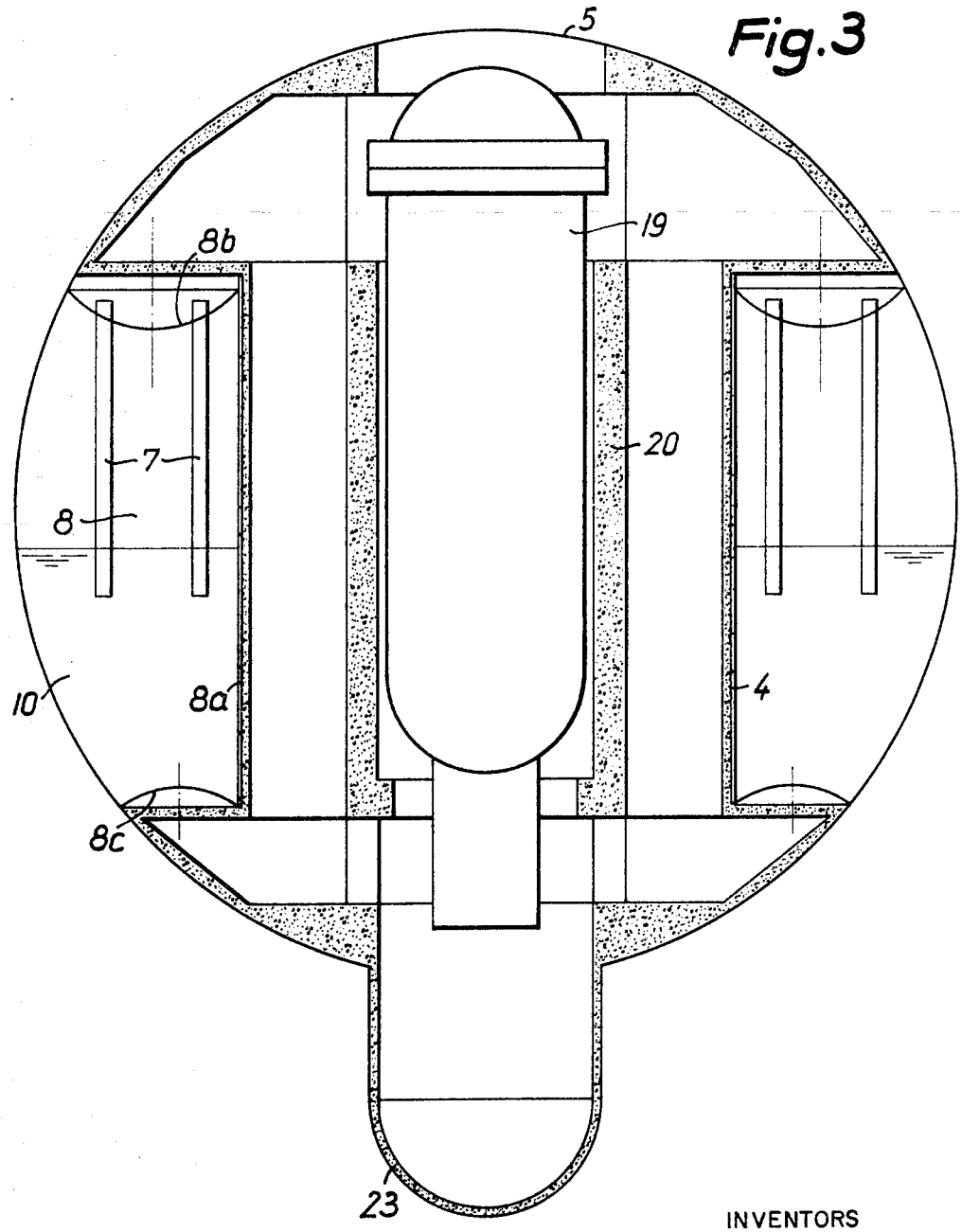

PRESSURE SUPPRESSION CONTAINMENT FOR A LIQUID-COOLED NUCLEAR REACTOR

BACKGROUND OF THE INVENTION

The present invention relates to containment and pressure suppression apparatus for a liquid-cooled nuclear reactor.

The primary system of most types of nuclear reactors used in nuclear power plants is conventionally enclosed in a gas-tight safety container formed by a spherical or otherwise suitably shaped pressure shell made of steel or concrete. This arrangement is known as "containment."

The primary function of the safety container is to continually control the radioactive material which is liberated during normal operation of the nuclear reactor; that is, to contain the radioactive material that leaks out so that it can be safely disposed of. The safety container also serves the function, in the case of a major reactor accident, to contain the escaping material until its activity had decayed or it has been eliminated. This requires that the safety container be constructed to withstand the thermal and pressure stresses which may arise under the severest accident conditions. In the case of water-cooled nuclear reactors these stresses are primarily due to the liberated steam.

The first safety containers which were constructed for water-cooled reactors were dimensioned so that they could withstand the pressure which would arise if the entire primary circulation were allowed to escape. It was later discovered, however, that the safety container could be made much smaller and much safer if a pressure suppression system were provided. In a system such as this, the steam-water-air-mixture which is produced during an accident is piped via tubes into a ready water reservoir where the steam is condensed. As a result, only a portion of the water in the primary circulation system contributes to an increase in pressure.

It may be easily seen that both the overall size and the wall thickness of a safety container used with a pressure suppression system can advantageously be reduced. In fact, a pressure suppression system also brings with it a number of ancillary advantages which increase the safety of the nuclear reactor. For example, the overpressure which is generated during an accident is quickly reduced, and by far the major portion of the active material is held back in the condensation water.

In practice, a pressure suppression system is constructed by arranging condensation or "suppression" chambers within the safety container. The particular configuration of pressure suppression containment has been the subject of considerable research. See, for example, Ashworth et al., "Pressure Suppression," *Nuclear Engineering* 5 (1962), pp. 313–321; Welchel, "Pressure Suppression Approved for Humboldt Bay," *Electrical World*, Nov., 1960, pp. 68–72, 98; Welchel and Robbins, "Pressure Suppression Containment for Nuclear Power Plants," ASME, Paper No. 59–A–215, Oct., 1960, pp. 1–10; and U.S. Pat. No. 3,115,450 to Schanz (FIG. 7).

Although the prior art knows a number of variations of pressure suppression and containment apparatus, the known types of construction are all based upon the following principle: The reactor pressure vessel, together with its surrounding biological shield, is arranged inside a completely enclosed, dry wall protective chamber. The protective chamber is surrounded, in turn, by the condensation (suppression) chamber. Vent pipes are provided to communicate between the reactor pressure vessel and the condensation chamber. The protective chamber, as well as the condensation chamber, are then encapsulated by the outer pressure shell or safety container.

This type of construction has a number of disadvantages. In every case, a portion of the main steam conduit which leads from the reactor through the safety container to the turbine will be located between the protective chamber and the pressure shell. If this portion of the steam conduit breaks, it can force water from the condensation chamber through the condensation tubes into the protective chamber; that is, exactly the opposite of what is desired. In addition, the space into which the steam flows in case of an accident — hereinafter referred to as the "pressure chamber" — will be relatively small. This fact can result in the exertion of unfavorable loads or pressures against the wall of the safety container.

SUMMARY OF THE INVENTION

It is, therefore, a primary object of the present invention to provide containment apparatus having a safety container in the favorable shape of a sphere and a pressure reducing or pressure suppression system which overcomes the disadvantages of the prior art systems described above.

It is an additional object of the present invention to provide containment and pressure suppression apparatus which directs steam to a condensation chamber regardless where a break occurs, in the primary circulation system, within the safety container.

It is an additional object of the present invention to provide containment and pressure suppression apparatus which includes sufficient compressable medium, such as air, for the initial expansion of steam in the case of an accident.

A further object of the present invention is to provide a liquid-cooled nuclear reactor with a compact, gas-tight safety container which can be built at a reduced cost.

A still further object of the present invention is to construct a liquid-cooled nuclear reactor within a spherical safety container so that optimum use will be made of the available space in accommodating the necessary accessories.

These, as well as other objects which will become apparent in the discussion that follows, are achieved, according to the present invention, by constructing the containment and pressure suppression apparatus of a liquid-cooled nuclear reactor in the following manner:

An annular condensation chamber filled with water, is arranged within a safety container formed by a spherical pressure shell. The condensation chamber is bounded at the outside by the spherical shell, on the inside by a cylindrical wall arranged within the spherical shell, and at the top and bottom by annular shaped ends connecting, respectively, the top and bottom of the cylindrical wall with the spherical shell. The height of the cylindrical wall is made somewhat less than the diameter of the safety container so that calotte-shaped spaces within the safety container will remain both above and below the condensation chamber. Condensation tubes, projecting from the upper annular end into the condensation chamber, place the upper calotte-shaped space in communication with the water in the chamber. A cylindrical biological shield, the diameter of which is somewhat less than the diameter of the cylindrical wall, is arranged coaxially within the cylindrical wall and forms an annular passageway therewith from the upper to the lower calotte-shaped space. The reactor pressure vessel is then located within the biological shield.

BRIEF DESCRIPTION OF THE DRAWINGS

FIGS. 2a and 2b are two quarter sections of the pressure suppression and containment apparatus of FIG. 1 taken along the lines 2a and 2b, respectively.

FIG. 3 is a simplified representation of the apparatus of FIG. 1.

FIG. 4 is a sectional view of a detail of the apparatus of FIG. 1 showing the manner in which the condensation tubes are attached to the upper annular end.

DESCRIPTION OF THE PREFERRED EMBODIMENTS

Figure 1:
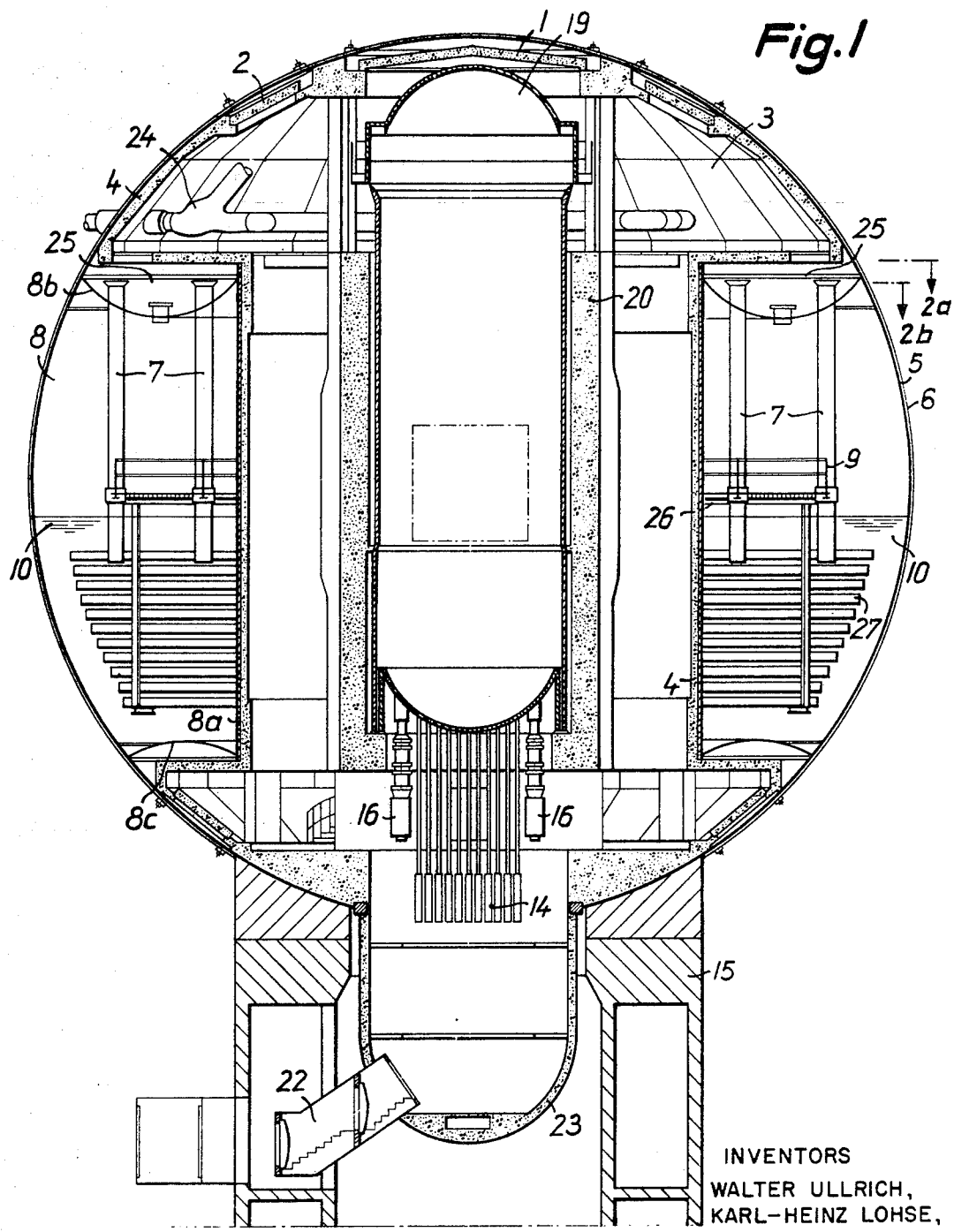
FIG. 1 is a longitudinal sectional view of the pressure suppression and containment apparatus according to the present invention.

Referring now to the drawings, FIG. 1 shows, in detail, a longitudinal section of the spherical safety container according to the present invention. Since FIG. 3 is a simplified illustration of that which is shown in FIG. 1, FIG. 3 will be described together with FIG. 1.

The safety container consists of a steel sphere 5 and an outer sealing skin 6, the sphere 5 and skin 6 being connected to each other by way of suitable spacers or indentations. The space between the sphere and the skin is kept at a reduced pressure, by a vacuum pump or other suitable means. The steel sphere rests on a foundation 15 in the building housing the reactor.

The actual reactor, namely, the reactor pressure vessel for a water-cooled reactor with the reactor core and the like, is arranged at the center of the sphere. Various embodiments of such reactors are well known in the art so they will not be described here in detail. All that is shown are the control rod drives 14, the coolant circulating pumps 16, as well as the primary steam conduit 24 which passes through the pressure shell.

The pressure vessel 19 is surrounded axially by a concrete jacket, constituting the biological shield 20, and rests on a socket thereof at its lower end. The pressure suppression system lies concentrically with respect to the shield; it takes the form of an annular condensation chamber 8 which is bounded on the outside by the wall of the sphere, on the inside by a steel cylinder 8a, and at the top and on the bottom by annular steel ends 8b, 8c. As shown in the drawings, the upper steel end 8b and the lower steel end 8c may assume the shape of sections of a toroid. The condensation chamber is half filled with water 10, there being a large number of condensation tubes 7 which extend from the upper annular end to a point below the water level. In the case of a 600 MW power plant, there may, for example, be 76 such tubes, each having a diameter of 61 cm. These tubes provide a permanently open communication between the condensation water and the remaining volume or "free volume" of the pressure chamber. The walls within the safety container are so fashioned that the spaces formed between them have a large free cross section; they therefore form spaces within the pressure chamber through which gases may flow, practically unhindered, to quickly establish a pressure equilibrium.

As best seen in FIG. 3, the pressure chamber so produced has a very large volume. It consists, for all practical purposes, of the two calotte-shaped spaces above and below the condensation chamber, and the inner cylinder, between the biological shield and the condensation chamber, which communicates between them. If the primary circulation system ruptures, the very large volume will itself already contribute to a reduction in pressure. Furthermore, the steam-air-water-mixture in the pressure chamber will be piped through the condensation tubes into the cold water, where it will condense and keep the pressure rise within reasonable limits.

The bottom of the sphere is provided with a cylindrical extension; namely, the bottom trough 23, which is needed to complete the drive for the control rods. The presence of this bottom trough permits the sphere to be made smaller than otherwise, this reduction in size providing the advantages of thinner walls, lower weights, and lower price. The bottom trough 23 is provided with an access lock 22 having an inclined axis. The purpose of the inclined axis is to obtain a spherical opening in the extension 23. Two vertical doors are provided within the lock. This construction makes it possible to build and test the body of the lock separately and then to weld it on after the safety container has been pressure-tested. A cover is provided on the inside of the container, instead of the missing lock, while the container is being tested.

The annular steel ends 8b, 8c have the advantage, over the other types of closures, that they have a very small radius.

The annular ends can be produced, for example, by forming a steel tube into the shape of a ring, to produce an annulus, and cutting it horizontally, along the desired plane, so that the small radius of the tube will be taken into account. In this way, it is possible to keep the wall thickness of the annular ends below the 30 mm annealing limit which must be observed during welding operations.

A shown in FIGS. 2 and 4, pressure struts 25 are attached to the annular ends. The pulling forces which arise when the ends are subjected to pressure would normally have a marked influence on the spherical shell; the pressure struts pick up these forces, however, so that it is possible to make do without the sphere thicknesses which would otherwise be necessary to provide reinforcement. As shown in FIG. 4, the pressure struts and the annular ends are attached to the sphere 5, and the inner steel cylinder 8a, by way of a member 28 having a K-shaped cross section.

It should also be noted that the vertical condensation tubes are straight and are provided at the top with inlet funnels. These tubes thus exhibit a significantly lower pressure drop when fluid flows through, than do the bent condensation tubes of the prior art. The low pressure drop allows the pressure differential between the pressure chamber and the condensation chamber to be kept small, so that wall thicknesses and construction costs can be reduced.

For reasons of safety, the condensation tubes are mutually braced — each against the other — by a bracket 26. This is advisable because, due to condensation shocks and other thermo-hydraulic functions, transverse forces may arise at the lower ends of the tubes. Without this bracing, the relatively long condensation tubes, which are welded into the upper end plate, would have to be made substantially thicker with a corresponding increase in cost. The mutual bracing also permits the condensation tubes to be combined into a packet or unit, so that no transverse forces are transmitted to the inner cylinder 8a or to the spherical shell 5.

The above described bracing or anchoring of the condensation tubes can also be used to provide the base for a circular cat walk 9 for inspection of the reactor. Furthermore, the anchoring makes it possible to provide baffle plates 27, the purpose of which is to prevent circulation of the water, to eliminate the necessity of welded on pieces which would impede the expansion of the containment shells.

In all the containment systems heretofore known, the steel shell could be damaged if a valve spindle or any other circulation system part is blown off and flung against it under the pressure prevailing in the conduits. By providing protective plates near openings and an internal concrete cover 4 on the pressure shell and on the inner cylinder 8a of the condensation chamber 8, the parts of the container which are under pressure are safely protected. This protective concrete must leave free large cross sections above the upper end plate 8b so as to allow for a fluid flow out of the pressure chamber into the condensation tubes. This is done by means of profiled concrete beams which fully overlap one another but which leave free large openings that permit the flow of fluid.

The safety container has covers 1 and 2 for charging the reactor and for permitting assembly and installation of parts. During operation of the reactor these covers are screwed to the sphere, with the aid of conical seating surfaces, to form a gas-tight seal.

Positioning the axial pumps, which circulate the coolant, within the interior of the safety container and directly on the pressure vessel has advantage, compared to external pump circulating systems that the pressure suppression system can be made still smaller. One reason for this is that less space is needed; another reason is that there is a smaller volume of water in the primary circulation system which requires less water in the condensation chamber. Another favorable result is that the largest possible rupture opening under the worst possible accident conditions will be smaller.

The safety container according to the present invention may be used to particular advantage with boiling water reactors. It can also be used, however, with pressure water reactors or any other reactors employed in the chemical engineering arts.

It will be understood that the above description of the present invention is susceptible to various modifications, changes and adaptations.

We claim:
1. Containment and pressure suppression apparatus for a liquid-cooled nuclear reactor comprising, in combination:
   a. a spherical pressure shell constituting a safety container;
   b. a cylinder arranged within said shell, the axis of said cylinder being vertical and passing through the center of said shell, and the height of said cylinder being less than the diameter of said shell;

c. an upper annular end connecting the top of said cylinder with said shell;

d. a lower annular end connecting the bottom of said cylinder with said shell; said shell, said cylinder and said upper and lower ends constituting the walls of a condensation chamber and leaving calotte-shaped regions of said shell above and below said condensation chamber;

e. tube means projecting from said upper end into the condensation chamber for placing the calotte-shaped region above the condensation chamber in communication with a condensation coolant in said condensation chamber;

f. a cylindrical biological shield arranged coaxially within said cylinder, thereby forming an annular passageway between said shield and said cylinder from the calotte-shaped region above to the calotte-shaped region below the condensation chamber;

g. a reactor pressure vessel arranged within said shield; and h. a steam pipe arranged in said calotte-shaped region above the condensation chamber for passing steam from said reactor pressure vessel out of said shell.

2. The apparatus defined in claim 1 wherein the upper and lower annular ends have the shape of sections of a toroid.

3. The apparatus defined in claim 2, further comprising a pressure strip means for reinforcing said upper and lower annular ends.

4. The apparatus defined in claim 3, wherein said pressure strip means has a plurality of pressure struts connected to said shell and to said cylinder, and further including members each having a K-shaped cross section and connected to respective ones of said pressure struts, said shell, and a respective one of said upper and lower annular ends.

5. The apparatus defined in claim 4, further comprising a cylindrical extension projecting downward from said shell beneath said reactor pressure vessel.

6. The apparatus defined in claim 5, further comprising an access lock having at least two vertical lock doors, said access lock being attached to said cylindrical extension.

7. The apparatus defined in claim 5 wherein said tube means include a plurality of vertically arranged straight tubes, the upper ends of which are provided with outwardly flaring funnels and welded to said upper annular end.

8. The apparatus defined in claim 7 wherein the lower ends of said tubes are connected together by a brace.

9. The apparatus defined in claim 8, further comprising access walk means arranged within said condensation chamber and supported by said brace, for permitting inspection of the nuclear reactor.

10. The apparatus defined in claim 9, further comprising baffle plate means, attached to said brace, for preventing circulation of the water in the condensation chamber.

11. The apparatus defined in claim 10 wherein portions of said cylinder and said shell are provided with concrete cover means to prevent punctures in the regions of said cylinder and said shell which are subjected to pressure.

12. The apparatus defined in claim 11, further comprising pump means, arranged within said shell at said reactor pressure vessel, for circulating the reactor coolant.

13. The apparatus defined in claim 12 wherein said shell includes a steel wall surrounded by a sealing layer, said sealing layer being separated from said steel wall by spacing means, the space between said steel wall and said sealing layer being maintained at a reduced pressure.

14. The apparatus defined in claim 13 wherein said upper and lower annular ends are made of steel.

15. The apparatus defined in claim 14 wherein said shell is made of concrete.

16. The apparatus defined in claim 14 wherein said shell is made of steel.

* * * * *